(12) United States Patent
Norenburg et al.

(10) Patent No.: US 12,237,793 B2
(45) Date of Patent: Feb. 25, 2025

(54) DEVICE AND METHOD FOR OPERATING A DRIVE SYSTEM

(71) Applicant: SEW-EURODRIVE GMBH & CO. KG, Bruchsal (DE)

(72) Inventors: Benjamin Norenburg, Karlsdorf-Neuthard (DE); Christian Senft, Karlsruhe Grünwettersbach (DE); Sebastian Richter, Heidelberg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 215 days.

(21) Appl. No.: 17/796,736

(22) PCT Filed: Dec. 11, 2020

(86) PCT No.: PCT/EP2020/025573
§ 371 (c)(1),
(2) Date: Aug. 1, 2022

(87) PCT Pub. No.: WO2021/151456
PCT Pub. Date: Aug. 5, 2021

(65) Prior Publication Data
US 2023/0073603 A1    Mar. 9, 2023

(30) Foreign Application Priority Data

Jan. 31, 2020   (DE) .................. 102020000646.9

(51) Int. Cl.
*H02P 27/06*   (2006.01)
*H02M 1/32*    (2007.01)
*H02P 29/028*  (2016.01)

(52) U.S. Cl.
CPC .......... *H02P 29/028* (2013.01); *H02M 1/325* (2021.05); *H02P 27/06* (2013.01)

(58) Field of Classification Search
CPC ........ H02P 29/028; H02P 27/06; H02M 1/325
See application file for complete search history.

(56) References Cited

U.S. PATENT DOCUMENTS 6,172,941 B1 *  1/2001  Bieramperl ........ A63B 24/0021
                                                     700/251
7,737,652 B2 *  6/2010  Schwesig ............. H02P 29/027
                                                     318/432

(Continued)

FOREIGN PATENT DOCUMENTS

DE    102005006286 A1    8/2006
DE    102005008050 A1    9/2006

(Continued)

OTHER PUBLICATIONS

International Search Report issued in corresponding International Application No. PCT/EP2020/025573 dated Mar. 29, 2021, pp. 1-2, English Translation.

(Continued)

*Primary Examiner* — Rina I Duda
(74) *Attorney, Agent, or Firm* — Carter, DeLuca & Farrell LLP

(57) ABSTRACT

A drive system includes a frequency converter, a drive unit, and a power supply. The drive unit includes an electric motor and a further component, including a sensor element, actuator element, and/or data storage element. The frequency converter supplies the further component of the drive unit with energy via at least the power supply. The frequency converter is adapted to obtain a first piece of information about the maximum available electrical energy of the power supply and to obtain a second piece of information about the electrical energy requirement of the further component of the drive unit. The frequency converter is adapted to check the plausibility of the first piece of information with respect to the second piece of information. The decision-making (Continued)

criterion for the plausibility check is formed by a logical comparison of the first piece of information with the second piece of information. The frequency converter is configured to adapt the system state of the drive system in accordance with the result of the plausibility check.

23 Claims, 7 Drawing Sheets

(56) References Cited

U.S. PATENT DOCUMENTS

| | | | | |
|---|---|---|---|---|
| 8,659,258 | B2* | 2/2014 | Donner | G01R 31/42 |
| | | | | 318/599 |
| 8,966,022 | B2* | 2/2015 | Lessmann | H04L 41/145 |
| | | | | 370/254 |
| 11,031,896 | B2 | 6/2021 | Hatakeyama et al. | |
| 2006/0187085 | A1 | 8/2006 | Griepentrog et al. | |
| 2009/0031152 | A1 | 1/2009 | Wolfgang et al. | |
| 2014/0352396 | A1* | 12/2014 | Rauh | G01D 5/24461 |
| | | | | 73/1.01 |
| 2017/0141581 | A1 | 5/2017 | Yamamoto | |

FOREIGN PATENT DOCUMENTS

| | | | | |
|---|---|---|---|---|
| DE | 102006036770 | A1 | | 2/2008 |
| DE | 102007052445 | A1 | | 6/2008 |
| DE | 102007040425 | A1 | | 2/2009 |
| DE | 102007007601 | B4 | | 6/2010 |
| EP | 2787405 | A1 | | 10/2014 |
| GB | 2405753 | A | * | 3/2005 ............. H02M 1/32 |
| WO | 2019026125 | A1 | | 2/2019 |
| WO | 2019198257 | A1 | | 10/2019 |

OTHER PUBLICATIONS

International Report on Patentability issued in corresponding International Application No. PCT/EP2020/025573 dated Jul. 28, 2022, pp. 1-9, English Translation.

* cited by examiner

DEVICE AND METHOD FOR OPERATING A DRIVE SYSTEM

FIELD OF THE INVENTION

The present invention relates to a device and a method for operating a drive system.

According to example embodiments, the drive system has a power supply, a frequency converter, and a drive unit.

BACKGROUND INFORMATION

German Patent Document No. 10 2013 005 237 describes discloses a drive system and a method for operating a drive system, having an angle sensor, with which the angular position of the rotor shaft of an electric motor is detected, and a converter which supplies the motor by a supply cable.

German Patent Document No. 10 2013 007 649 describes a system and method for operating a system, including an electric motor supplied by a converter via a connecting cable acting as a supply cable, wherein motor-side signal electronics are arranged on the motor, in particular, wherein the signal electronics have at least one sensor, one actuator, and/or one data storage device, and signals are transmitted from the signal electronics to a converter-side signal electronics system via the connecting cable.

German Patent Document No. 10 2007 040 425 describes a method for assigning an address on the basis of an action taking place outside of the bus system.

A method for operating an electrical system is described in European Patent Document No. 2 787 405.

German Patent Document No. 10 2007 040 425 describes an electric motor with a junction box, in which a module is arranged, to which sensors and actuators can be connected.

A method for optimizing a control program is described in German Patent Document No. 10 2007 007 601.

A method for commissioning at least one field device is described in German Patent Document No. 10 2006 036 770.

SUMMARY

Example embodiments of the present invention provide for improvement of the energy transmission of the drive system.

In the energy transmission according to an example embodiment of the present invention, the electrical energy generated by the power supply is transmitted to the drive unit, which includes an electric motor and at least one further component, and converted by the further component of the drive unit in order for electrical work to be performed there.

In this case, the frequency converter has no information about the electrical energy that can be made available from the power supply or information about the electrical energy required to operate the further component of the drive unit.

If these two pieces of information are not sufficiently coordinated with one another, however, this can cause anything from errors to a total failure of the entire drive system.

According to example embodiments of the present invention, however, the frequency converter gains access to this information before the transition to the regular operating state, in which it checks this information for plausibility via a logical comparison and uses the result of this plausibility check to set the system state of the drive system accordingly.

On the one hand, this makes it possible to protect the drive system from damage caused by an error in the configuration or by a faulty structure or an unauthorized combination of system components, and it also offers the user support in finding the cause, e.g., when troubleshooting and eliminating errors. On the other hand, there is also the possibility of operating the drive system with only a minimal electrical energy requirement, for example, due to an only limited range of functions of the drive unit.

According to an example embodiment of the present invention, in a device for operating a drive system, the drive system includes a frequency converter, at least one drive unit, and at least one power supply. The drive unit includes an electric motor and at least one further component including at least one sensor element, actuator element, and/or data storage element, and the frequency converter supplies the further component of the drive unit with energy via the power supply. The frequency converter is adapted to obtain a first piece of information about the maximum electrical energy available from the power supply, and the frequency converter is adapted to obtain a second piece of information about the electrical energy requirement of the further component of the drive unit. The frequency converter is adapted to check the plausibility of the first piece of information with respect to the second piece of information, and the decision-making criterion for the plausibility check is formed by a logical comparison of the first piece of information with the second piece of information. The frequency converter is configured to adapt the system state of the drive system in accordance with the result of this plausibility check.

A drive system is understood to be a system that converts electrical energy into rotary and/or linear movement and control processes. A drive system in this case includes a frequency converter and at least one drive unit connected thereto. The task of the frequency converter is to generate an AC voltage with variable frequency and amplitude from any input voltage, for example, AC or DC voltage, which is adapted to be suitable for directly supplying an electric machine or an electric motor, e.g., a synchronous or asynchronous motor. The frequency converter usually also has several sensor measurement channels, with the help of which the frequency converter carries out and monitors the control and regulation of the electric machine. In this case, the frequency converter is also adapted to make electrical energy available to these sensor measurement channels for the operation thereof.

A drive unit is a structural unit that converts electrical energy into kinetic energy by energy conversion. The drive unit includes an electric motor that is supplied by a frequency converter and usually at least one further component including sensor elements, actuator elements, and/or data storage elements, such as rotary encoders, distance encoders, temperature sensors, vibration sensors, installation position sensors, gyro sensors, GPS receivers, gravitational sensors, Hall sensors, electronically readable rating plates, and/or one or more electronic brakes. In this case, the drive unit can also have a gear which is mechanically connected directly to the electric motor and is configured to optimally adapt the torque or the speed of the electric motor to the needs of an industrial application. It is also possible that this structural unit also includes the frequency converter so that the drive system can be very compact.

A power supply is an independent device or module used to supply electrical power to devices or modules that require different voltages and currents than those provided by the general power grid. Electrical energy is a form of energy that is transmitted by electricity or stored in electrical fields.

The maximum available electrical energy means the amount of energy that a generating unit, for example, a power supply, can provide to a consumer. In this case, the generating unit is physically limited in terms of the maximum amount of electrical energy that can be made available to a consumer.

The electrical energy requirement describes the electrical energy requirement that is converted by an electrical device, for example, a component of a drive unit, during a defined period of time, in order to fulfill the respective function thereof. Plausibility checking means applying an assessment criterion that leads to a corresponding reaction. In this case, an assessment criterion is a logical comparison of the first piece of information with the second piece of information, as a reaction to which the system state of the drive system is adapted accordingly. The system state means the overall behavior of the entire drive system at a specific point in time. A drive system usually has a plurality of different states. For example, a distinction is only made among the following system states: "regular operating state" B1, "operating state with reduced electrical energy consumption of the drive unit" B2, "parameterization state" P, and "error state" F.

The regular operating state B1 is understood to mean the state of a fully functional machine or system without any sort of defects. If the respective machine or system is in its corresponding regular operating state, it is ready for use, it works in the manner intended therefor, and it has no faults or problems, and the frequency converter is able to access all sensor elements, actuator elements, and/or data storage elements of the drive unit in the regular operating state B1 of the drive system, it is able to establish digital data communication with these sensor elements, actuator elements, and/or data storage elements, and it is able to request parameter values, measurement data which characterize the temperature, the existing vibrations, the installation position, the relative or absolute actual angular or distance position of the drive unit and/or which contain the information on the electronic rating plate of the drive unit which is transmitted by these sensor elements, actuator elements, and/or data storage elements as a response to the frequency converter and which are used by the frequency converter itself for the control or regulation of the drive unit and/or which are transmitted from the frequency converter to a downstream safety device, in which this safety device monitors these parameter values by a safety function such as, for example, SAR (safe acceleration range), SBC (safe brake control), SBT (safe brake test), SCA (safe cam), SDI (safe direction), SLA (safely limited acceleration), SLI (safely limited increment), SLP (safely limited position), SLS (safely limited speed), SLT (safely limited torque), SMT (safe motor temperature), SOS (safe operating stop), SP (safe position), SS1 (safe stop 1), SS2 (safe stop 2), SSM (safe speed monitoring), SSR (safe speed range), STO (safe torque off), STR (safe torque range), or any combination of these safety functions, and the safety device immediately informs the frequency converter if the limit value of the safety functions used is exceeded.

Operating state B2 with reduced electrical energy consumption of the drive unit is to be understood as a system state in which the frequency converter is only able to actively access a reduced, restricted number of sensor elements, actuator elements, and/or data storage elements of the further component, which at least, however, provide for the electronic reading of the second piece of information about the electrical energy requirement of the drive unit, for example, as part of the electronic rating plate in the drive unit, and the further sensor elements, actuator elements, and/or data storage elements of the further component that are additionally present in the drive unit are deactivated in this case, e.g., in order to minimize the power consumption during the electronic reading of the second piece of information about the electrical energy requirement of the drive unit.

In this operating state B2, the frequency converter is only able to operate the electric motor with a reduced, restricted number of parameter values that come from the reduced, restricted number of sensor elements, actuator elements, and/or data storage elements of the further component, and the functional scope is limited due to the reduced set of parameter values that are used by the frequency converter itself for controlling or regulating the drive unit and/or that are transmitted from the frequency converter to a downstream safety device for monitoring the parameter values.

Fail-safe operation of the drive system is, for example, possible with this arrangement, since the compatibility of the system components, e.g., the configuration thereof, is checked independently by the frequency converter. This reduces the commissioning time and contributes to an increase in system availability.

According to example embodiments, the frequency converter receives the first piece of information and/or the second piece of information during a parameterization state P of the drive system.

In this example embodiment, the compatibility of the system components, e.g., the configuration thereof, is checked before the transition to a regular operating state B1. As a result, configuration errors are detected early on during commissioning of the drive unit, which results in improved support during the commissioning process.

According to example embodiments, the first piece of information and/or the second piece of information is communicated to the frequency converter by a user via a device, e.g., via configuration software and/or a DIP switch.

A DIP switch is a series of several small switches, e.g., slide switches, which are combined in a common housing, which usually has a configuration with two rows of connections arranged parallel to one another, which are applied directly to a printed circuit board and the switch positions thereof can be read electronically.

In this example embodiment, conventional system components can be seamlessly integrated into the drive system, e.g., even without an electronic rating plate.

According to example embodiments, the frequency converter reads the first piece of information electronically from the power supply and/or reads the second piece of information electronically from the drive unit.

Electronic reading of the first or second piece of information is to be understood as meaning that this parameter value is in the form of a datum on an electronically readable data storage element which is a fixed component of an independent device or a module, e.g., the further component of the drive unit or the power supply. The data storage element must be connected to the device or module such that it is also automatically replaced when the device or module is replaced.

For example, a user-friendly commissioning of the drive system can be implemented with this example embodiment, since the frequency converter independently reads out the information required for the plausibility check from the further component and/or the power supply.

According to example embodiments, the frequency converter determines the first piece of information and/or the second piece of information by a test.

If the first piece of information and/or the second piece of information cannot be accessed electronically, the frequency converter has the option of carrying out a test in order to assess these two pieces of information or the plausibility check result itself. This is done to check that the electrical energy that can be made available by the power supply is always sufficient to provide the maximum energy required by the further component of the drive unit. This test is carried out, for example, after the system has been restarted, during the parameterization state P, or at regular time intervals.

For example, user-friendly commissioning of the drive system can be implemented with this example embodiment, since the frequency converter independently determines the information required for the plausibility check or the plausibility check result by a test, which means that older system components that have not yet stored this information electronically on a data storage element can be used.

According to example embodiments, the frequency converter includes the power supply, and the first piece of information is stored in the frequency converter at the factory during manufacture.

The first piece of information from the integrated power supply is stored directly in an electronically readable data storage element directly by the manufacturer of the frequency converter, for example, during assembly or after completion.

In this example embodiment, in which the power supply is integrated into the frequency converter, a space-saving variant can be implemented, which also provides for ready handling for the user and reduces additional storage costs caused by an additional power supply.

According to example embodiments, the drive unit has an operating mode with a reduced electrical energy requirement, and this operating mode provides for at least the electronic reading of the second piece of information and the reduced electrical energy requirement reliably does not exceed a maximum value.

For example, in this example embodiment, a standard size of a power supply can be defined, in which the electronic reading of the second piece of information is always possible during use of the power supply, even if the maximum possible electrical energy requirement of the further components of the drive unit is greater than the maximum available energy of the power supply.

According to example embodiments, the drive unit always starts in the operating mode with a reduced electrical energy requirement after a restart.

A restart or power-up is understood here to mean switching on the drive system for the first time and/or switching it on again, e.g., after the configuration has been changed and/or after a system component has been replaced. During the restart, the drive system is usually transitioned from a quiescent, energy-free system state to an energy-consuming system state, and/or the computing units contained in the drive system are loaded with the currently valid configuration (current program sequence, current data set).

For example, in this example embodiment, it is ensured that the electronic reading of the second piece of information is always possible, even after a change in the configuration and/or after a system component has been replaced.

According to example embodiments, the power supply makes available at least the maximum value of electrical energy which the drive unit requires in the operating mode with a reduced electrical energy requirement.

In this example embodiment, the power supply is able to provide the drive unit with sufficient energy to provide for the frequency converter to always read out the second piece of information, e.g., during a restart.

According to example embodiments, the drive system switches to the regular operating state B1 when the first piece of information is greater than or equal to the second piece of information.

This ensures that the drive system is only operated with the full range of functions when there is reliably sufficient electrical energy available to operate the further components of the drive unit.

According to example embodiments, the drive system switches to the error state F when the first piece of information is less than the second piece of information.

An error is thus reported to the user at an early stage, e.g., with a description of the cause of the error, for example, the use of a power supply that is not suitable for the application, and the drive system is transitioned to a safe system state. This prevents hazardous behavior of the drive unit, for example, due to a highly probable sudden loss of communication of system-important sensor and/or actuator data during operation.

According to example embodiments, the drive system switches to the operating state B2 when the first piece of information is less than the second piece of information, and the drive unit is operated only in the operating mode with reduced electrical energy requirement.

This makes it possible to reduce the number of variants of the system components of the drive system by always using a drive unit with the full range of functions, and the frequency converter and the power supply can be adapted to the required range of functions.

For example, in this example embodiment, the drive system can be operated such that the second piece of information can always be queried. A possible cause of the error, e.g., caused by using a power supply that is too weak in the drive system, can be reliably reported to the user. As a result, the time required for commissioning or servicing can be significantly reduced.

According to example embodiments, the frequency converter monitors the actual electrical energy requirement of the drive unit, and the actual electrical energy requirement is measured and/or a data exchange with the drive unit is checked. The drive system switches to the error state F if the actual electrical energy requirement is greater than the second piece of information and/or if data exchange with the drive unit is not possible.

Monitoring is to be understood as the targeted observation and collection of information about the parameter of the electrical energy which the power supply provides to the further component of the drive unit and which is carried out by the frequency converter. This monitoring is implemented either by measuring the actual electrical energy requirement, e.g., the electrical current and/or voltage actually flowing, in the connection line between the power supply and the further component of the drive unit; this is usually inside the housing of the frequency converter. If an excessive electric current is flowing and/or if a voltage dip below a voltage threshold value required for safe operation of the further component of the drive unit can be detected, the drive system is set to the error state F.

It is also possible to monitor the exchange of data between the frequency converter and the further component of the drive unit for communication errors instead of the current or voltage measurement or in addition to these measurements. Data exchange, e.g., electronic data exchange, means the exchange of data using electronic transfer processes. The drive system is likewise transitioned to the error state F if errors occur frequently during this data exchange, in a specific time interval compared to a time interval with a normal data failure rate, due to the use of the drive system in a harsh industrial environment.

In this example embodiment, aging of system components, short circuits, and/or excessively long connection lines between the frequency converter and a further component of the drive unit can be identified at an early stage so that the drive system can be transitioned to a safe system state in the event of an error.

According to example embodiments, the frequency converter monitors the electrical energy made available by the power supply, and the drive system switches to the error state F if the electrical energy actually available is less than the first piece of information.

This monitoring is implemented either by measuring the electrical energy provided by the power supply, e.g., the electrical current and/or voltage provided, in the connection line between the power supply and the further component of the drive unit; this is usually inside the housing of the frequency converter. If a voltage dip to below a voltage threshold necessary for the safe operation of the further component of the drive unit can be detected, the drive system is set to the error state F.

For example, with this example embodiment, it can be recognized early on if the power supply does not correspond to the specification and/or if the suitable combination of components for constructing the drive system was not used.

According to example embodiments, the frequency converter tests the operability of the drive system by operating the drive unit in an operating mode with the maximum electrical energy requirement.

Testing is to be understood as a methodical attempt to determine whether the electrical energy available from the power supply is sufficient to operate the drive system in a manner that is fully functional and error-free. It is possible to activate all further components of the drive unit as energy consumers.

A test is possible with this example embodiment, in which it can be checked that the drive system is fully functional in the current configuration of the system components even under worst-case conditions.

According to example embodiments, a switchable load can only be activated in the drive unit during the test of the functionality of the drive system.

In this case, an additional load means a further consumer, for example, a resistor configured for this purpose, which is used either as an additional consumer together with all further components of the drive unit which are activatable for the test or used as a substitute for the test instead of the further activatable components of the drive unit.

For example, the worst-case condition for the test is further intensified in this example embodiment, which further increases the availability of the drive system in the real operating state, since failures caused by a power supply that is too weak become less likely.

According to example embodiments, in the error state F, the configuration software offers the option of reordering the power supply and/or drive unit, and the electrical properties thereof are adapted to the first piece of information and/or the second piece of information.

Adjusted electrical properties means that, for example, the configuration software receives the first piece of information and/or the second piece of information and/or the cause of the error from the frequency converter and from this derives a recommendation for eliminating the error. Through a device, e.g., through a database system of the drive system manufacturer, the configuration software is also able to suggest a specific power supply or a specific drive unit in order to eliminate the cause of the error.

For example, with this example embodiment, the user can quickly be offered a solution to the problem, e.g., also during the initial commissioning of the drive system.

According to example embodiments, the first piece of information and/or the second piece of information can be limited depending on the license.

License-dependent limitation means that a user can expand the functionality of the power supply and/or the drive unit after receiving a device, an approval, or authorization, usually in the form of a license key.

For example, with this example embodiment, the variance and thus the storage costs of the devices can be further reduced.

According to example embodiments, in the error state F, a license activation is offered via the configuration software, and the properties thereof are adapted to the first piece of information and/or the second piece of information.

The user can be offered a solution to the problem quickly. For example, functionality can be purchased later if required without having to replace the device or the module in the system.

According to example embodiments, both the electrical energy supply for the further component and the data exchange with the further component are implemented via a common two-wire line, e.g., via a coaxial cable.

In this context, a two-wire line is defined as a two-wire combination of individual lines that is sheathed in insulating materials and used to transmit electrical energy and/or data between the frequency converter and the drive unit.

A coaxial cable is a two-pole cable with a concentric structure. They usually include an inner conductor which is surrounded by a hollow-cylindrical outer conductor at a constant distance. The outer conductor shields the inner conductor from electromagnetic interference. For example, the coaxial cable is adapted to be integrated into a hybrid cable that includes additional connection lines that are used, for example, to operate an electric motor.

For example, an error source can be ruled out in this example embodiment, since both the lines for the electrical energy supply and the lines for data communication are routed via the same connection lines.

According to an example embodiment of the present invention, in a method for operating the drive system, the drive system is in a parameterization state, and, in a first step, a frequency converter can be provided a first piece of information about the maximum available electrical energy of a power supply and/or a second piece of information about the electrical energy requirement of a further component of the drive unit by the user via configuration software, and/or the frequency converter can read out the first piece of information and/or the second piece of information from at least one electronic rating plate. In a second step, the frequency converter checks the first piece of information and the second piece of information for completeness, in which a missing first piece of information and/or missing second piece of information is determined by a measurement method. In a third step, the frequency converter checks the first piece of information and the second piece of information for plausibility, in which a first piece of information greater than or equal to the second piece of information leads to a transition to a regular operating state (B1), and a first piece of information less than the second piece of information leads to a transition to an error state or an operating state with reduced electrical energy consumption in the drive unit.

According to example embodiments, an actual energy requirement of the further component of the drive unit and/or an actually available electrical energy of the power supply are monitored in the regular operating state, and a deviation from the first piece of information and/or the second piece of information that is too great with regard to tolerances leads to a transition to the error state.

Further features and aspects of example embodiments of the present invention are explained in more detail below with reference to the appended schematic Figures.

DETAILED DESCRIPTION

Figure 1:
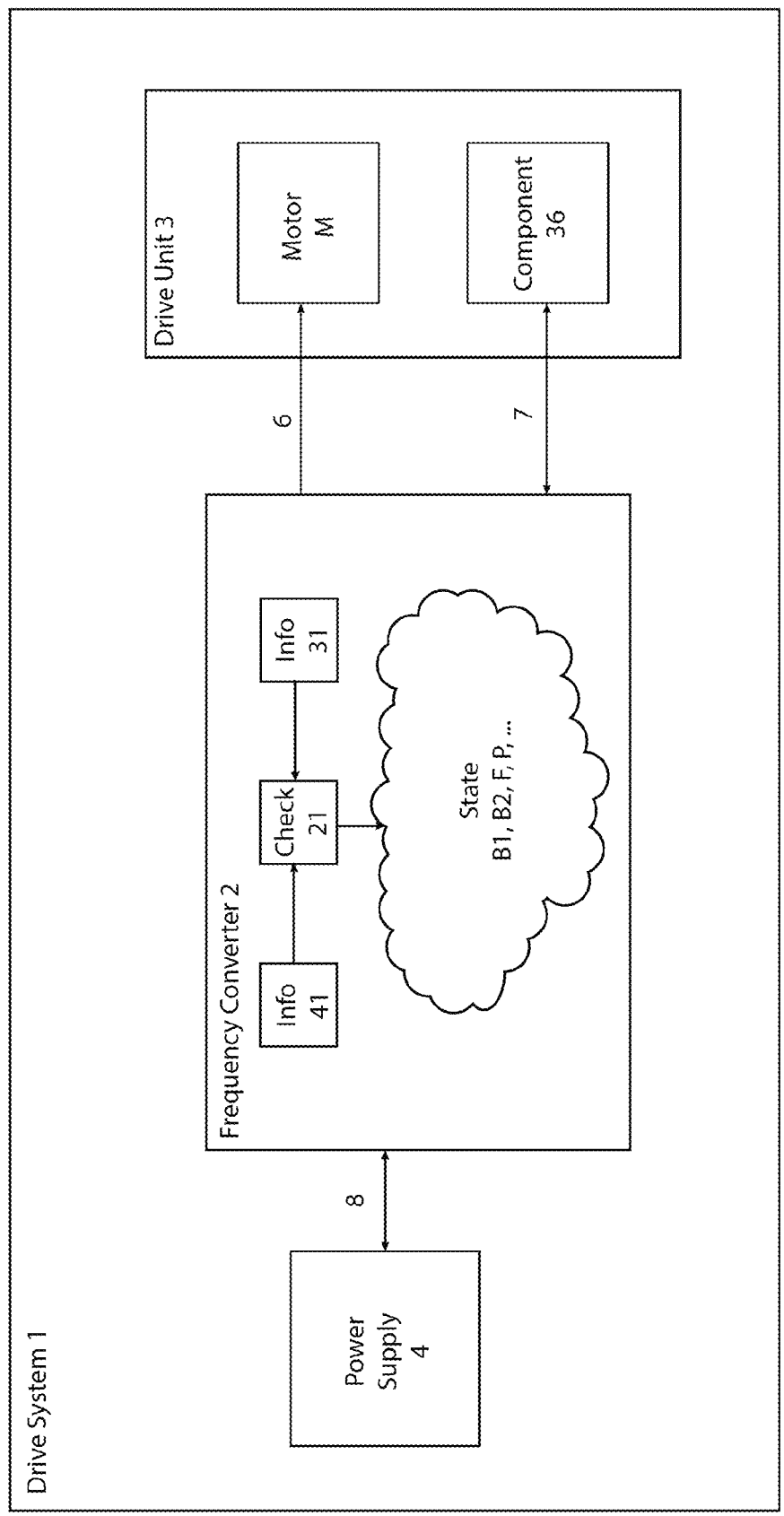
FIGS. 1 to 7 illustrate example embodiments of the present invention.

The drive system (1) according to an example embodiment of the present invention is schematically illustrated in FIG. 1. This includes a frequency converter (2), at least one drive unit (3), and at least one power supply (4).

The drive unit (3) includes an electric motor (M) and at least one further component (36), which includes at least one sensor element, actuator element, and/or data storage element. The further component (36) includes elements such as a rotary encoder, distance encoder, temperature sensor, vibration sensor, installation position sensor, gyro sensor, GPS receiver, gravitational sensor, Hall sensor, electronically readable rating plate, and/or one or more electronic brakes.

The drive unit (3) in this case is directly electrically connected to the frequency converter (2) via a cable consisting of connection lines (6) for operating the electric motor (M) and additional connection lines (7) for operating the sensor element, actuator element, and/or data storage element connected to the further component (36). Both the energy supply to the further component (36) and data communication with the further component (36) take place via the additional connection lines (7).

For example, the additional connection lines (7) are arranged as coaxial lines. This minimizes the risk of interference on the additional connection lines (7) caused by the crosstalk of the usually hard-switching PWM signals on the connection lines (6) required to operate the electric motor (M). For example, data communication or data exchange also takes place in a frequency range that is outside the typical interference spectrum for operating electric motors (M), over 500 kHz, 1 MHz, 10 MHz, 50 Mhz.

The power supply (4) is also directly electrically connected to the frequency converter (2) via a connection line (8). The power supply (4) is arranged either as an external power supply that can be connected directly to the frequency converter (2) via a separate interface, or the power supply (4) is integrated into the frequency converter (2). Also possible is a variant that includes an external power supply which, for example, supports the internal power supply via a separate interface with the frequency converter (2) and is understood to be a power supply (4) in the drive system (1).

The task of the power supply (4) is generally to reliably supply the further component (36) of the drive unit (3) with electrical energy via the frequency converter (2) and the additional connection lines (7).

For this purpose, the frequency converter (2) is given access to a first piece of information (41) about the maximum available electrical energy of the power supply (4) via a first device or arrangement. The frequency converter (2) also has access to a second piece of information (31) about the electrical energy requirement of the additional sensor elements, actuator elements, and/or data storage elements of the further component (36) via a further device or arrangement. The frequency converter (2) has the special task of checking the first piece of information (41) with respect to the second piece of information (31) for plausibility. This plausibility check, for example, includes a logical comparison of the two information values, (41) or (31), with one another. The result of this plausibility check (21) is finally used to automatically place the entire drive system (1) in one of these system states: regular operating state (B1), operating state with reduced electrical energy consumption of the drive unit (B2), or error state (F).

Figure 2:
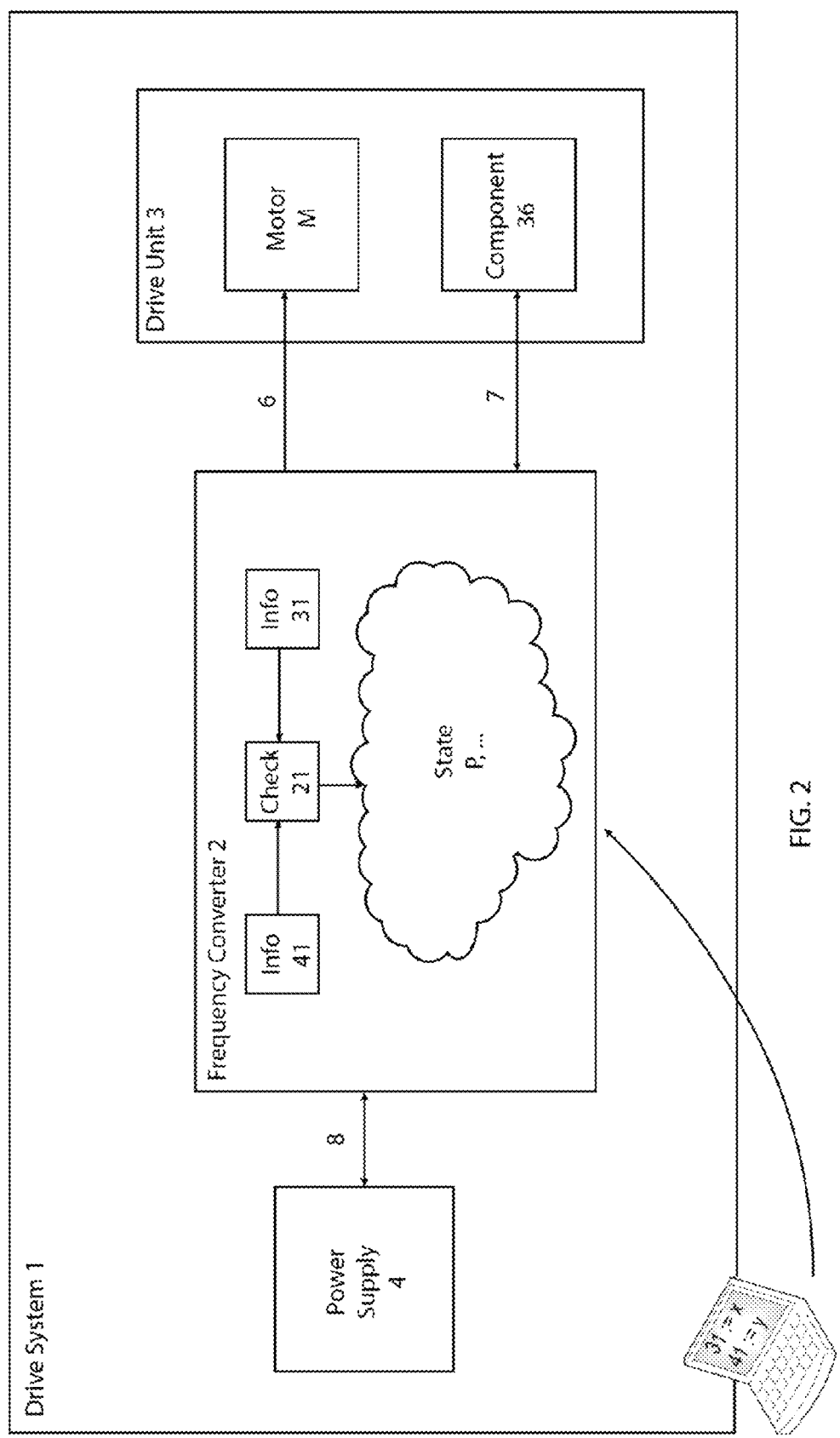

FIG. 2 illustrates an exemplary implementation of the drive system (1) indicating how the frequency converter (2) determines the first piece of information (41) and/or the second piece of information (31) for the plausibility check.

In this case, the frequency converter (2) of the drive system (1) is, for example, initially placed in a parameterization state (P). During this parameterization state (P), a user who knows the information respectively required for the drive unit (3) and/or the power supply (4) can communicate the first piece of information (41) and/or the second piece of information (31) to the frequency converter (2). This can be implemented, for example, using configuration software (5), e.g., using the MOVISUITE® engineering software from SEW-EURODRIVE. It is also possible to use one or more DIP switches located in the drive system (1) and readable by the frequency converter (2), which are set accordingly by a user. A specific information value is assigned to a specific configuration of the DIP switches, which information value the frequency converter (2) interprets as a first piece of information (41) and/or as a second piece of information (31) accordingly.

Figure 3:
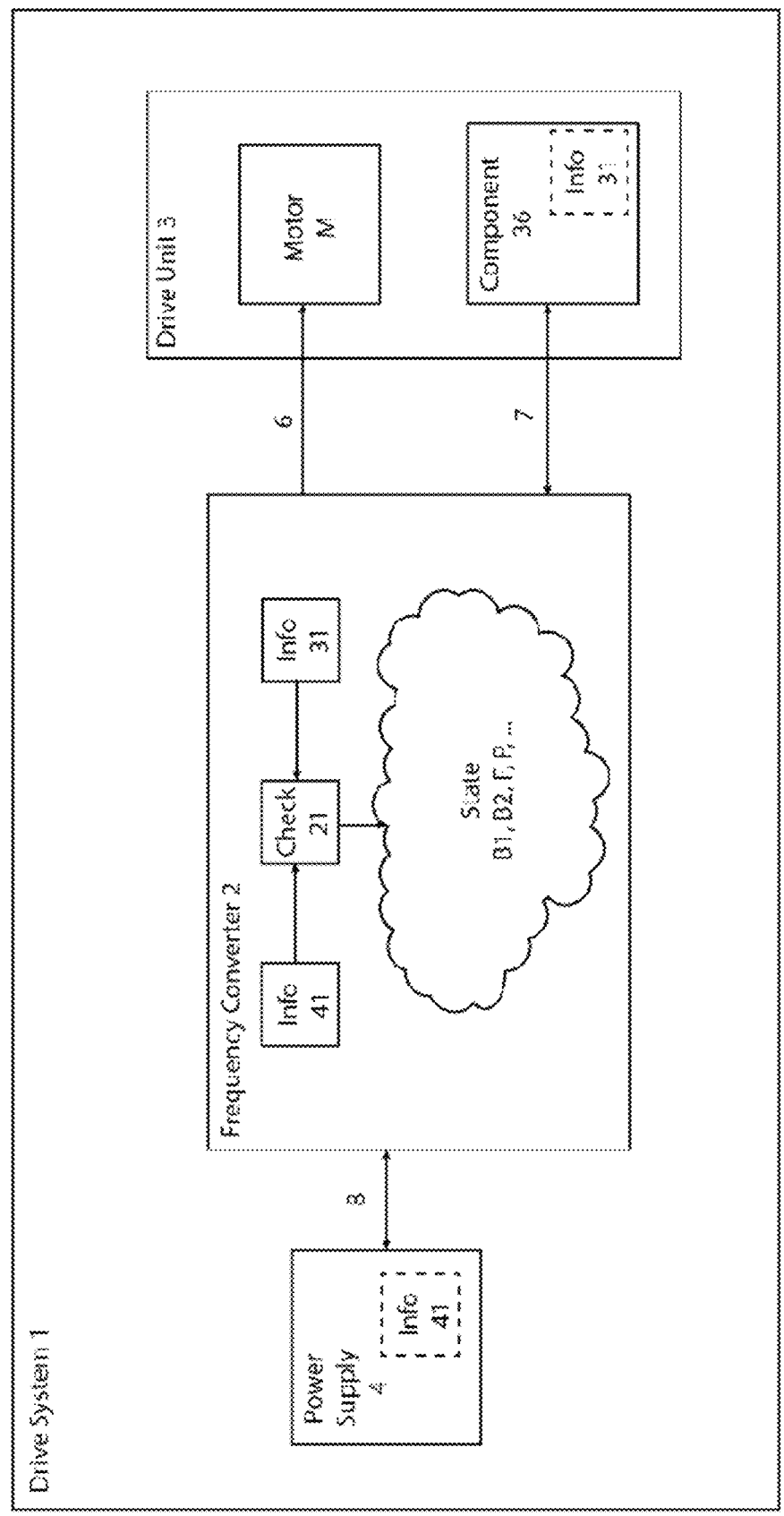

Another possibility is illustrated in FIG. 3 showing how the frequency converter (2) determines the first piece of information (41) and/or the second piece of information (31) for the plausibility check.

In this case, the frequency converter (2) is first placed in a parameterization state (P). During this parameterization state (P), the frequency converter (2) is able to operate the drive unit (3), at least in the operating state with reduced energy consumption (B2), via the power supply (4). It is also possible that the drive unit (3) is initially started in an operating state with reduced energy consumption (B2) of the drive unit (3) upon a restart (POWER-ON) or upon a RESET of the entire drive system (1), and the frequency converter (2) is thus able to supply the drive unit (3) via the power supply (4).

The power supply (4) is adapted to provide at least the energy that the drive unit (4) also requires in the operating state with reduced energy consumption (B2).

In this state, the frequency converter (2) is able to request at least the second piece of information (31) via the additional connection lines (7). This second piece of information (31), for example, can be part of an electronic rating plate of the drive unit (3), which can be queried by the frequency converter (2) and which is located on a data storage element that can be clearly assigned to the drive unit (3), so that, when the drive unit (3) is replaced with a new drive unit, the data storage element with the second piece of information (31) is likewise replaced. It can thus be ensured that the value of the second piece of information (31) always corresponds to the energy requirement of the drive unit (3) currently connected to the frequency converter (2).

For example, the frequency converter (2) is also capable of electronically querying the first piece of information (41) directly from the power supply (4). This first piece of information (41), for example, can be part of an electronic rating plate of the power supply (4), which can be queried electronically by the frequency converter (2) and which is, for example, located on a data storage element that can be clearly assigned to the power supply (4), so that, when the power supply (4) is replaced with a new power supply (4), the data storage element with the first piece of information (41) is likewise replaced. It can thus be ensured that the value of the first piece of information (41) always corresponds to the maximum available energy of the power supply (4) currently connected to the frequency converter (2).

Figure 4:
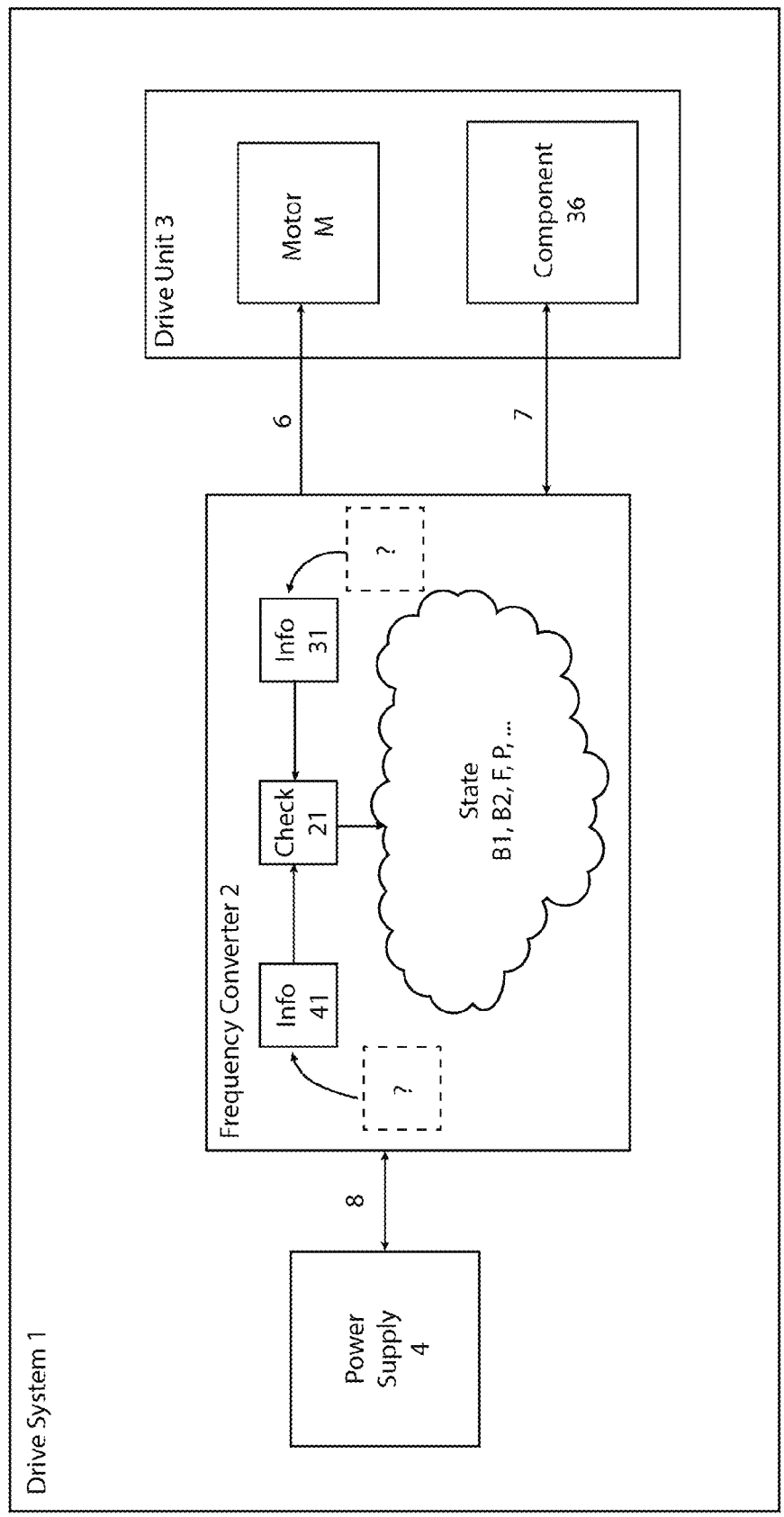

FIG. 4 illustrates how the frequency converter (2) determines the result of the plausibility check of the first piece of information (41) and the second piece of information (31) by a test.

For this purpose, the drive unit (3) is initially operated in an operating mode with maximum energy requirement (33). This can be implemented by activating all available additional sensor elements, actuator elements, and/or data storage elements as consumers, for example. It is also possible that a switchable load (35) can only be activated as part of the further component (36) during the test, which switchable load either acts as a representative of a maximum load that occurs on the drive unit (3) or which is still additionally switchable to the already activated consumers—meaning all available additional sensor elements, actuator elements, and/or data storage elements. This means that the test can also be used to provide a reliable statement in the worst-case scenario, for example caused by an additional connection line that is significantly longer than the specified additional connection line and is the maximum permitted in the manual, or caused by higher energy consumption of the drive unit (3) due to losses caused by heating of the additional sensor elements, actuator elements, and/or data storage elements due to extreme operating conditions in the industrial environment.

Either the frequency converter (2) knows the first piece of information (41) about the maximum available energy of the power supply (4), for example, because this was already communicated to the frequency converter (2) during the production process, or the frequency converter (2) is able to make a decision as to whether the power supply (4) is sufficient to operate the drive unit (3) by measuring the energy consumption in the additional connection line, the electrical signals of which are usually routed via a plug connector and are also physically present on a circuit board of the frequency converter (2) and are therefore always available for a measurement within the frequency converter (2). If the frequency converter (2) does not have access to the first piece of information (41) about the maximum energy available from the power supply (4) or the second piece of information (31) about the energy requirement of the drive unit (3), it is also possible that the frequency converter (2) checks whether data communication between the drive unit (3) and frequency converter (2) is error-free, i.e., without data loss, in this state of the drive unit (3) with maximum energy requirement (33). If no data communication error occurs within a defined test period, the frequency converter (2) assumes that the power supply (4) is sufficient to operate the drive unit (4) without errors.

Figure 5:
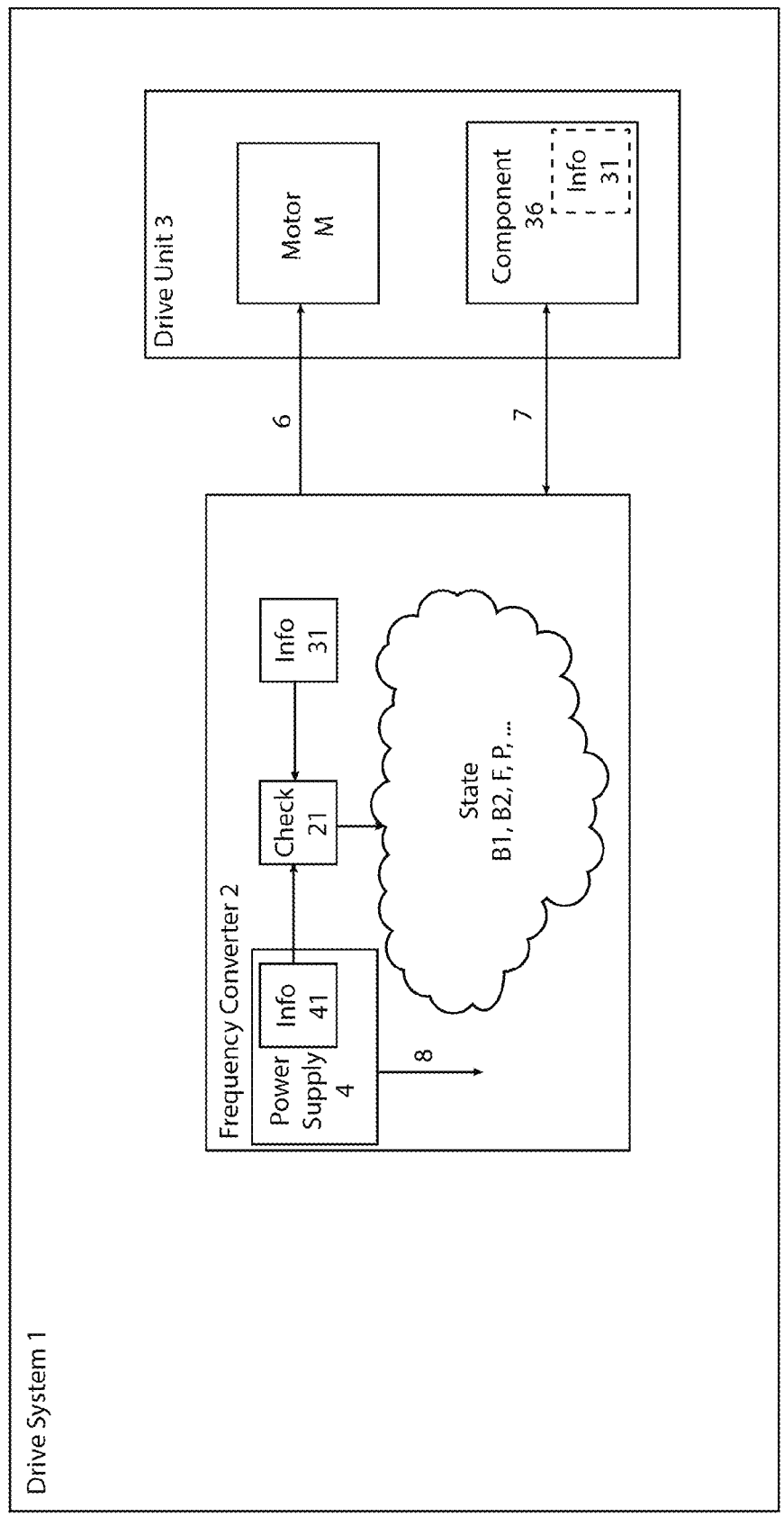

FIG. 5 illustrates a further exemplary embodiment of a drive system (1). In this case, the second piece of information (31) for the plausibility check is determined by the frequency converter (2) via a test, while the first piece of information (41) is already stored on a data storage element of the frequency converter (2).

This is possible if the power supply (4) is already integrated into the frequency converter (2). In this case, the first piece of information (41) about the maximum available energy is already stored in a data storage element of the frequency converter (2) during the production process, i.e., directly during manufacture. Thus, the frequency converter (2) has direct access to the first piece of information (41) for the plausibility check. The second piece of information (31) is determined by a test as described in connection with FIG. 4.

Figure 6:
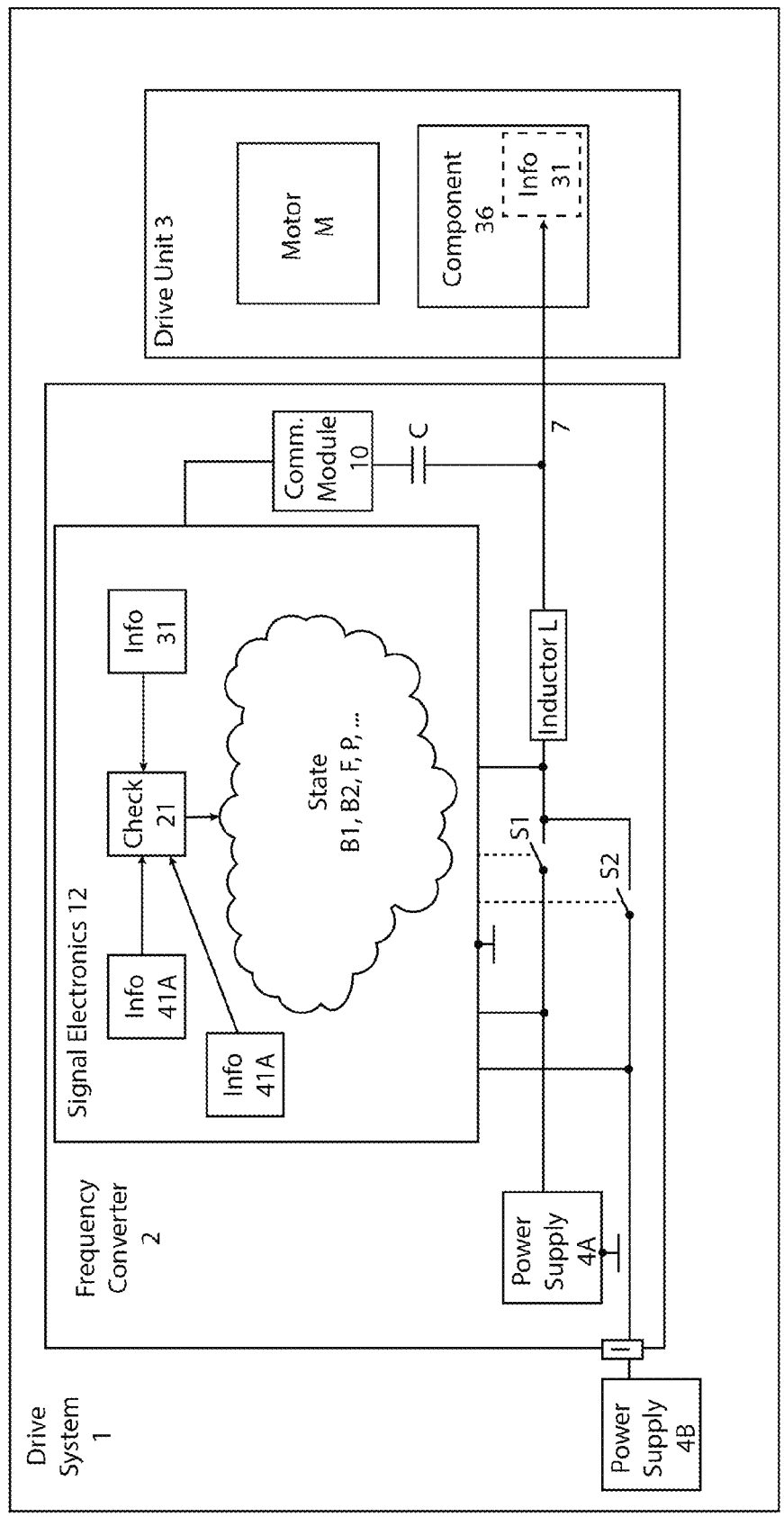

FIG. 6 illustrates an exemplary implementation of a drive system (1).

In this example embodiment, the frequency converter (2) includes an internal power supply (4A) and the option of connecting an external power supply (4B) via a plug connector.

The signal electronics (12) of the frequency converter (2) are able to obtain the first piece of information about the maximum available energy, (41A) or (41B), for each of the power supplies, (4A) or (4B). In addition, the signal electronics (12) can use a communication module (10) to query the second piece of information about the electrical energy requirement (31) of the further component (36) of the drive unit (3). For this purpose, the data signal from the communication module (10) is modulated onto the supply line via a capacitor.

Depending on which power supply, (4A) or (4B), is suitable for operating the further component of the drive unit (36), the supply voltage of the power supply, (4A) or (4B), is applied to the additional connection line for operating the further component (7) via one of the switches, (S1) or (S2). The signal electronics can also measure the voltages before and after the switches, (S1) or (S2), in order to detect errors in the supply voltage at an early stage.

Figure 7:
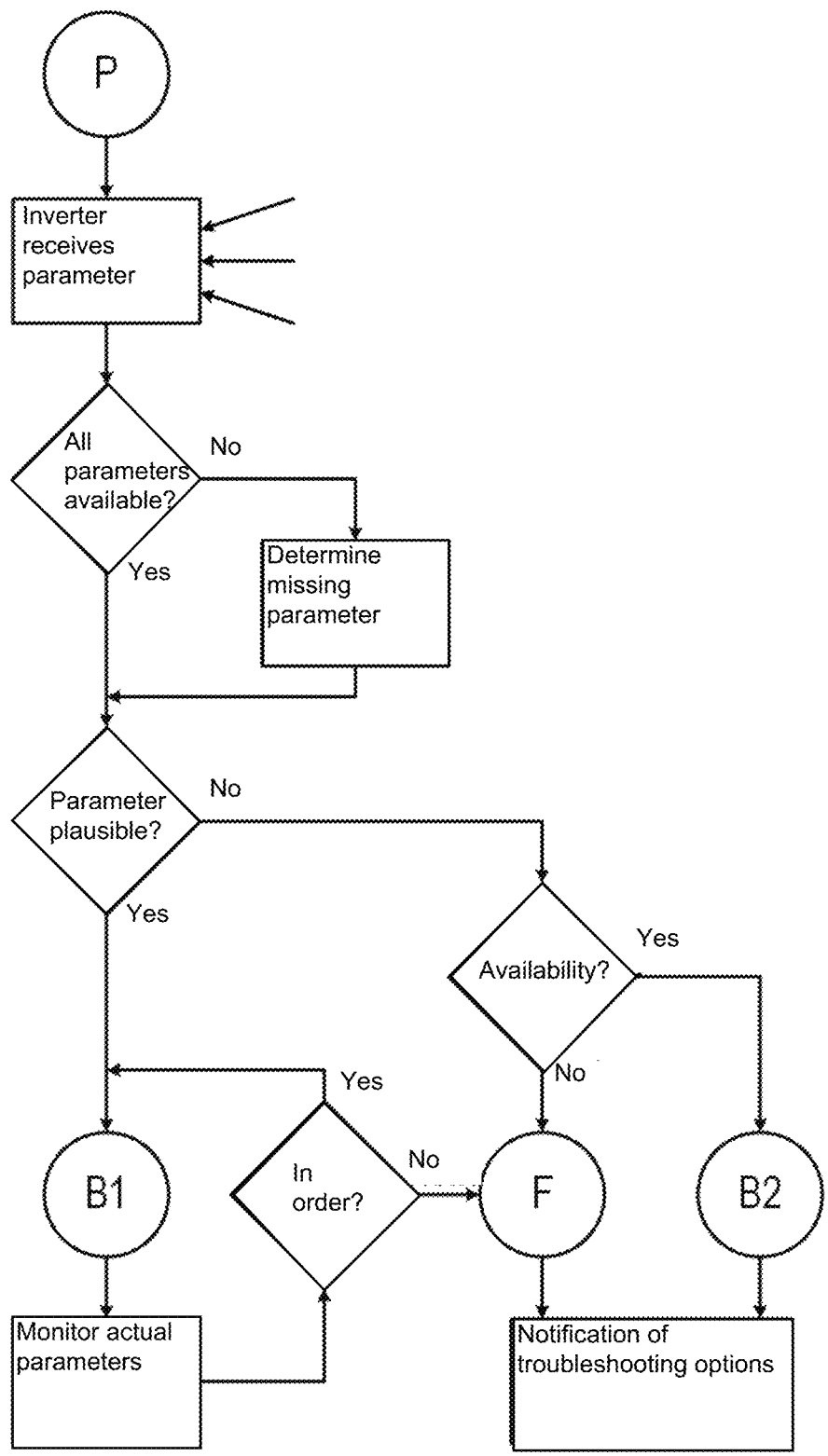

The behavior of a drive system (1) is schematically illustrated in FIG. 7.

First, the drive system (1) is placed in a parameterization state (P). This is achieved, for example, by configuration software (5) which exchanges data with the frequency converter (2), e.g., via a fieldbus system. The configuration software (5) is able to prompt the frequency converter (2) to switch to the parameterization state (P). It is also possible for a user to set the drive system (1) to the parameterization state (P) via a device on the frequency converter (2) itself, for example, via a switching element or via a sensor for picking up RFID signals.

In this state (P), the frequency converter (2) checks whether it has access to the current values for the first piece of information (41) and the second piece of information (31). At this point in time, a user also has the option of communicating the values for the first piece of information (41) and/or the second piece of information (31) to the frequency converter (2) via configuration software (5).

The frequency converter (2) is also able to search for the values independently, for example, by starting to query the rating plate of the drive unit (3) and power supply (4), if available.

If the first piece of information (41) and the second piece of information (31) are eventually available, the frequency converter (2) starts checking whether the two parameters are plausible. If the first piece of information (41) is greater than or equal to the second piece of information (31), the drive system (1) switches to the regular operating state (B1).

If the plausibility check shows that the first piece of information (41) is less than the second piece of information (31), the drive system (1) switches either to the error state (F) or to the operating state (B2) with a drive unit (3) that only works in the operating mode with reduced energy requirement (32). At least in the error state (F), the frequency converter (2) is able to offer a reordering of the power supply (4) and/or drive unit (3) via a device or arrangement, e.g., via the configuration software (5), and the properties thereof are adapted to the first piece of information (41) and/or the second piece of information (31). If the plausibility check of the frequency converter (2) shows, for example, that the power supply (4) of the drive unit (1) is too weak and cannot provide the energy required to operate the drive unit (3), the user is provided with another power supply and/or a power supply with sufficient energy.

During regular operation (B1) of the drive system (1), it is also possible that the frequency converter (2) checks the actual energy consumption or energy requirement (34) at regular intervals, e.g., cyclically every 10 ms, 100 ms, 1 s, 10 s, for example, via a measurement and/or a data exchange with the drive unit (3), and both an actually determined energy requirement greater than the second piece of information (31) and/or a failed data exchange and actually available energy (42) less than the first piece of information (41) places the drive system (1) in the error state (F).

As further behavior of a drive system (1), it is also possible that the first piece of information (41) and/or the second piece of information (31) is limited depending on the license. For example, a power supply (4) could be adapted to be integrated into a frequency converter (3), which by default is fundamentally able to deliver more energy. A frequency converter (2) can thus be produced which is available in different forms with regard to the energy that can be made available for operating the additional sensor elements, actuator elements, and/or data storage elements of the drive unit (3). Using configuration software (5), it is possible for this limitation to be adjusted according to the needs of a user after a license key is received.

If the drive system is in the error state (F) and the frequency converter (2) and/or the configuration software (5) has recognized that a power supply (4) is being used that can supply the lacking energy, the user is given the opportunity to acquire the required license key.

The following list of reference characters is included in the description and explains further features hereof.

LIST OF REFERENCE CHARACTERS

1 Drive system
10 Communication module
12 Signal electronics
2 Frequency converter
21 Plausibility check
3 Drive unit
31 Second piece of information about the electrical energy requirement
32 Operating mode with reduced electrical energy requirement
321 Maximum value of electrical energy
33 Operating mode with maximum electrical energy requirement
34 Actual electrical energy requirement
35 Switchable load
36 Further component of the drive unit
4, 4A, 4B Power supply
41, 41A, 41B First piece of information about the maximum available electrical energy
42 Electrical energy actually available
5 Configuration software
6 Connection lines for operating the electric motor
7 Additional connection lines for operating the further component
8 Connection line for connecting the power supply
P Parameterization state
B1 Regular operating state
B2 Operating state with reduced electrical energy consumption of the drive unit
F Error state
I Interface
M Electric motor
C Capacitor
L Inductor
S Switch

The invention claimed is:

1. A drive system, comprising:
a drive unit including an electric motor and a further component, the further component including a sensor element, an actuator element, and/or a data storage element;
a power supply; and
a frequency converter adapted to supply the further component of the drive unit with energy via the power supply, to obtain a first piece of information relating to a maximum available electrical energy of the power supply, to obtain a second piece of information relating to an electrical energy requirement of the further component of the drive unit, and to check a plausibility of the first piece of information with respect to the second piece of information, a decision-making criterion for the plausibility check including a logical comparison of the first piece of information with the second piece of information; and
wherein the frequency converter is configured to adapt a system state of the drive system in accordance with a result of the plausibility check.

2. The drive system according to claim 1, wherein the frequency converter is adapted to obtain the first piece of information and/or the second piece of information during a parameterization state.

3. The drive system according to claim 1, wherein the frequency converter is adapted to obtain the first piece of information and/or the second piece of information from a user.

4. The drive system according to claim 1, wherein the frequency converter is adapted to obtain the first piece of information and/or the second piece of information from a user via configuration software and/or a DIP switch.

5. The drive system according to claim 1, wherein the frequency converter is adapted to electronically read out the first piece of information from the power supply and/or electronically read out the second piece of information from the drive unit.

6. The drive system according to claim 1, wherein the frequency converter is adapted to determine the first piece of information and/or the second piece of information by a test.

7. The drive system according to claim 1, wherein the frequency converter includes the power supply.

8. The drive system according to claim 1, wherein the first piece of information stored in the frequency converter during manufacture.

9. The drive system according to claim 1, wherein the drive unit has an operating mode with a reduced electrical energy requirement, the operating mode providing for the electronic reading of the second piece of information, the reduced electrical energy requirement reliably does not exceed a maximum value.

10. The drive system according to claim 9, wherein the drive unit is adapted to always start in the operating mode with reduced electrical energy requirement.

11. The drive system according to claim 1, wherein the drive system is adapted to switch to an operating state in response to the first piece of information being greater than or equal to the second piece of information.

12. The drive system according to claim 1, wherein the drive system is adapted to switch to an error state in response to the first piece of information being less than the second piece of information.

13. The drive system according to claim 9, wherein the drive system is adapted to switch to an operating state in response to the first piece of information being less than the second piece of information, and the drive unit is operated only in the operating mode with reduced electrical energy requirement.

14. The drive system according to claim 1, wherein the frequency converter is adapted to monitor an actual electrical energy requirement of the drive unit, the actual electrical energy requirement is measured and/or a data exchange with the drive unit is checked, and the drive system is adapted to switch to an error state in response to the actual energy requirement being greater than the second piece of information and/or data exchange with the drive unit not being possible.

15. The drive system according to claim 1, wherein the frequency converter is adapted to monitor the electrical energy made available by the power supply, and the drive system is adapted to switch to an error state in response to the electrical energy that is actually available being less than the first piece of information.

16. The drive system according to claim 1, wherein the frequency converter is adapted to test functionality of the drive system by operating the drive unit in an operating mode with maximum electrical energy requirement.

17. The drive system according to claim 16, wherein the drive unit is adapted to activate a switchable load only during the test of the functionality of the drive system.

18. The drive system according to claim 4, wherein the configuration software is adapted to offer reordering of the power supply and/or the drive unit in an error state, and having electrical properties adapted to the first piece of information and/or the second piece of information.

19. The drive system according to claim 1, wherein electrical energy supply of the further component and data exchange with the further component are implemented via a common two-wire line and/or a coaxial cable.

20. The drive system according to claim 1, wherein the drive system is adapted to perform a method in a parameterization state of the drive system, including:
providing the frequency converter with the first piece of information relating to a maximum available electrical energy of a power supply and/or the second piece of information relating to an electrical energy requirement of a further component of a drive unit by a user via configuration software, and/or reading out by the frequency converter the first piece of information and/or the second piece of information from an electronic rating plate;
checking, by the frequency converter, the first piece of information and the second piece of information for completeness;
determining a missing first piece of information and/or a missing second piece of information by a measurement process;
checking, by the frequency converter, the first piece of information and the second piece of information for plausibility;
transitioning to a regular operating state in response to the first piece of information being greater than or equal to the second piece of information; and
transitioning to an error state or an operating state with reduced energy consumption in response to the first piece of information being less than the second piece of information.

21. A method for operating a drive system in a parameterization state, comprising:
providing a frequency converter with a first piece of information relating to a maximum available electrical energy of a power supply and/or a second piece of information relating to an electrical energy requirement of a further component of a drive unit by a user via configuration software, and/or reading out by the frequency converter the first piece of information and/or the second piece of information from an electronic rating plate;
checking, by the frequency converter, the first piece of information and the second piece of information for completeness;
determining a missing first piece of information and/or a missing second piece of information by a measurement process;
checking, by the frequency converter, the first piece of information and the second piece of information for plausibility;
transitioning to a regular operating state in response to the first piece of information being greater than or equal to the second piece of information; and
transitioning to an error state or an operating state with reduced energy consumption in response to the first piece of information being less than the second piece of information.

22. The method according to claim 21, wherein an actual energy requirement of the further component of the drive unit and/or an actually available electrical energy of the power supply is monitored in the regular operating state, and a deviation from the first piece of information and/or the second piece of information that is too great with regard to tolerances leads to a transition to the error state.

23. The method according to claim 21, wherein the drive system includes the drive unit, the power supply, and the frequency converter;
wherein the drive unit includes an electric motor and the further component, the further component including a sensor element, an actuator element, and/or a data storage element; and
wherein the frequency converter is adapted to supply the further component of the drive unit with energy via the power supply, to obtain the first piece of information relating to the maximum available electrical energy of the power supply, to obtain the second piece of information relating to the electrical energy requirement of the further component of the drive unit, and to check a plausibility of the first piece of information with respect to the second piece of information, a decision-making criterion for the plausibility check including a logical comparison of the first piece of information with the second piece of information; and wherein the frequency converter is configured to adapt a system state of the drive system in accordance with a result of the plausibility check.

* * * * *